Oct. 27, 1959   S. D. POOL   2,909,883
ADJUSTABLE MOUNTING FOR IMPLEMENT ON TRACTOR
Filed Sept. 30, 1957   3 Sheets-Sheet 1
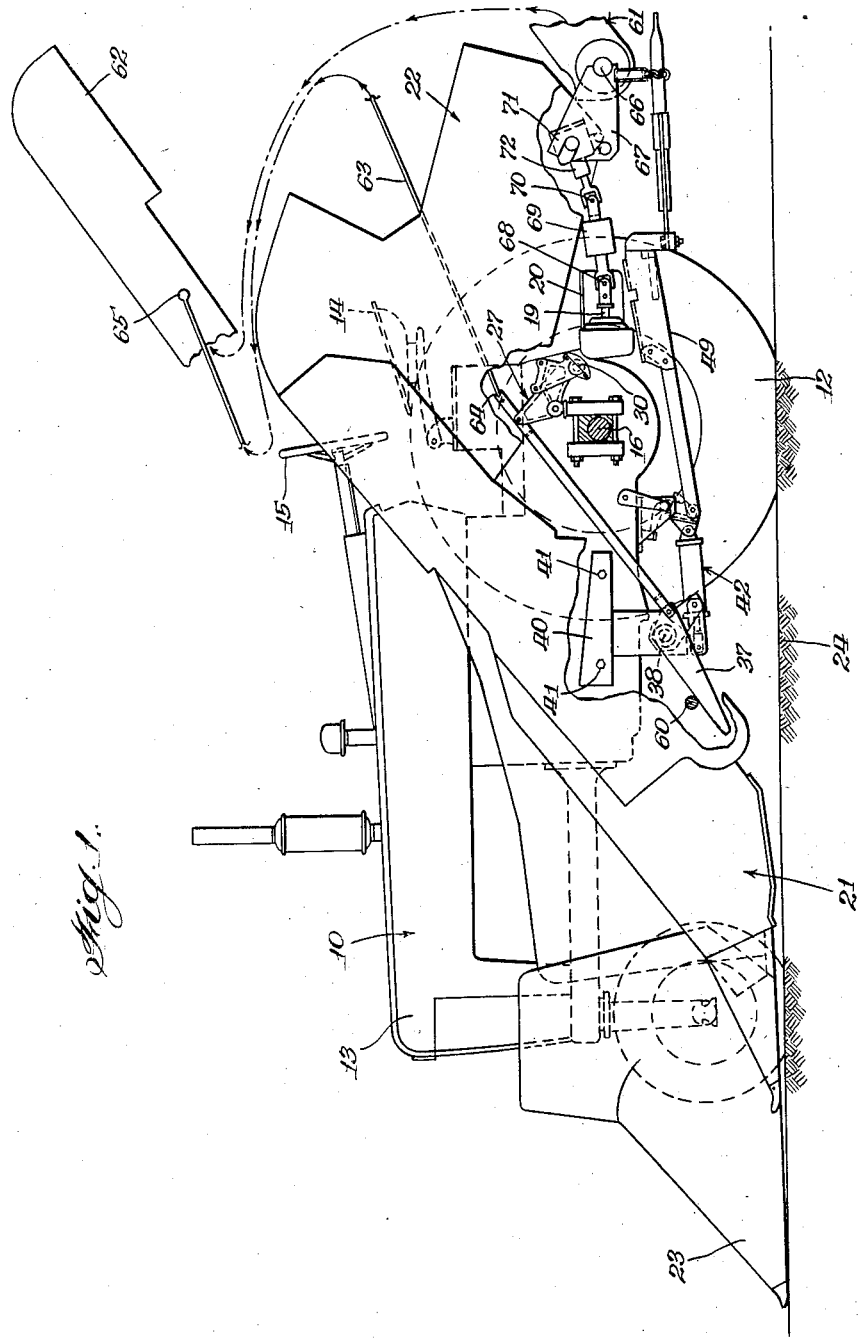
INVENTOR.
Stuart D. Pool
BY Paul O. Pippel
Atty.

Oct. 27, 1959   S. D. POOL   2,909,883
ADJUSTABLE MOUNTING FOR IMPLEMENT ON TRACTOR
Filed Sept. 30, 1957   3 Sheets-Sheet 2
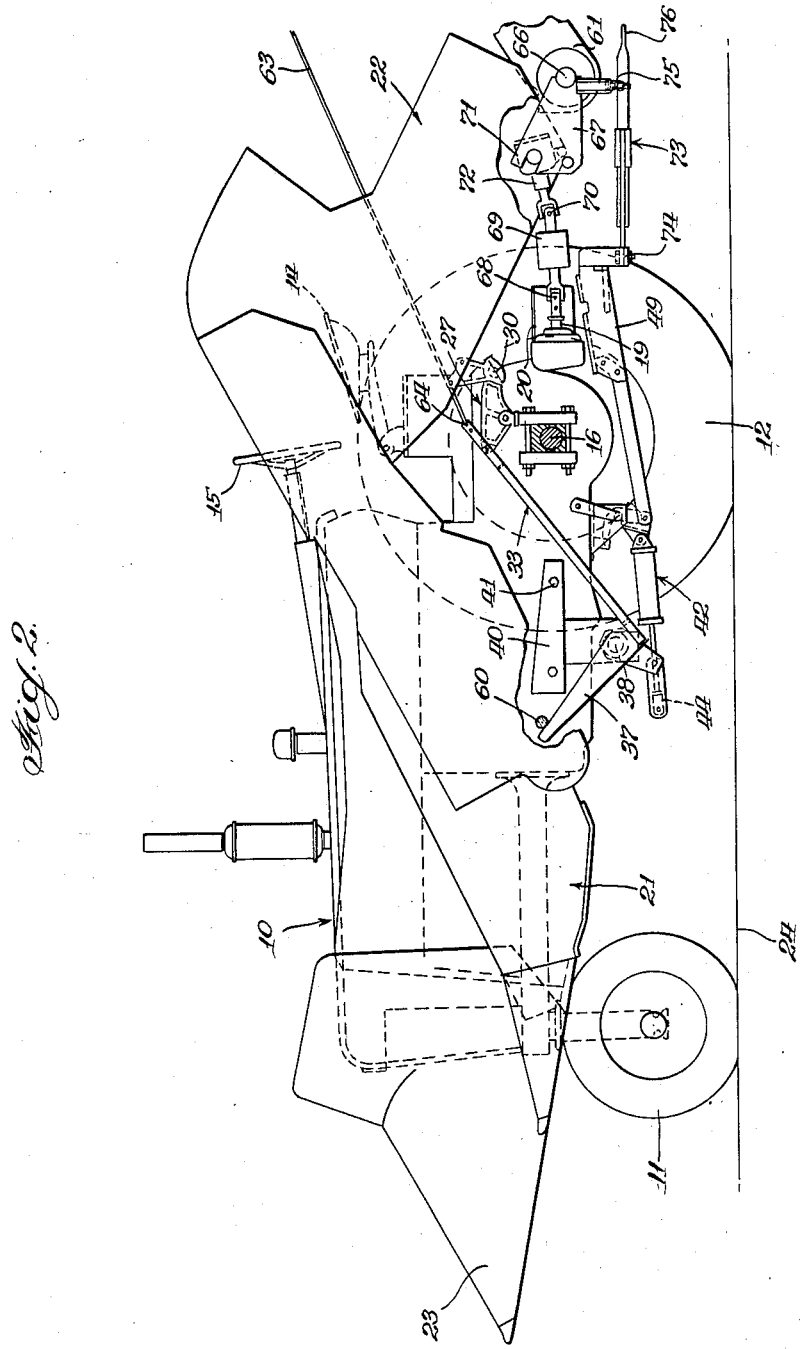
INVENTOR.
Stuart D. Pool
BY Paul O. Pippel
Atty

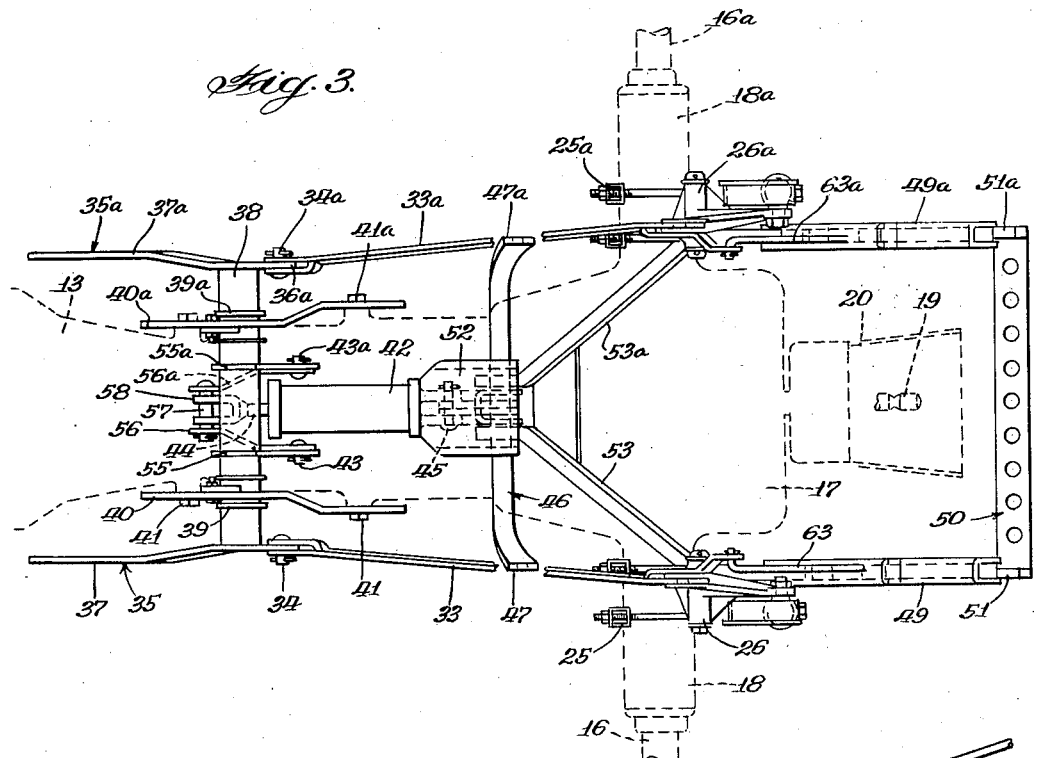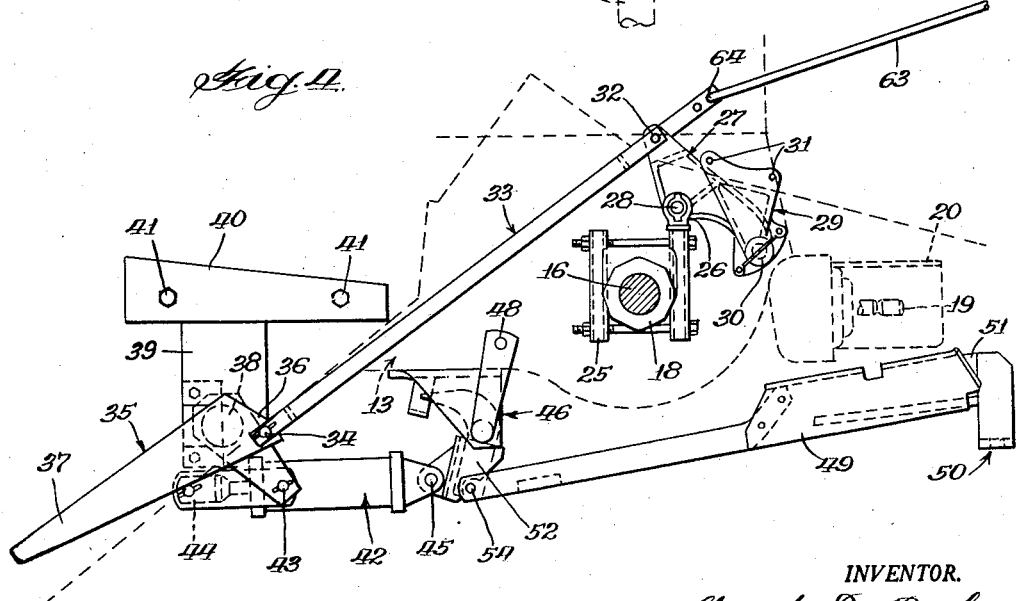

United States Patent Office 2,909,883
Patented Oct. 27, 1959

2,909,883

ADJUSTABLE MOUNTING FOR IMPLEMENT ON TRACTOR

Stuart D. Pool, Moline, Ill., assignor to International Harvester Company, Chicago, Ill., a corporation of New Jersey Application September 30, 1957, Serial No. 687,236

4 Claims. (Cl. 56—15)

This invention relates to a new and improved adjustable mounting for implements on tractors.

Agricultural implements which are employed to harvest crops are oftentimes large and unwieldy and it is difficult to efficiently mount them onto farm tractors. Many such harvesting implements require adjustment on the tractors for harvesting at different levels or for transporting of the tractor-mounted implement. The present invention is concerned particularly with corn harvesters, but it is not necessarily limited to use on corn harvesters or even agricultural implements. It is contemplated the device of this invention may be used on and for any tractor mounted implements which may include earthworking tools such as scrapers, dozers, graders, etc., and/or agricultural implements and tools of all classes and description. In a corn harvester there is a corn picking unit generally located at the forward portion of the machine and means at the rearward portion of the machine for elevating the harvested and treated ears of corn upwardly and rearwardly for delivery into a trailing wagon or the like. In various types of corn it is desirable for effective harvesting to raise or lower the picking units. In other words, if it is desired to harvest only the upper portion of the stalks carrying the ears and minimize the amount of stalk material which is carried through the corn picker and thus simultaneously treated therein, it would require a raising of the picking units from the ground so that only the upper portions of the corn stalks would be taken into the machine. This, of course, minimizes the amount of material passing through the corn harvester. If the corn harvester were merely pivotably mounted onto the rear axle structure of the tractor such as in corn harvesters previous to this one, the range of vertical movement permitted to the pickup portions of the corn harvester would be limited simply because the rearwardly extending wagon elevator would be tilted downwardly and if moved to any great extent would contact and interfere with the ground. Many attempts have been made to correct this condition such as by having the rearward ends of the corn pickers separate from the forward portions and fixedly mounting the husking units and wagon elevators onto the back ends of the tractors and merely hinging the forward corn picking units on the tractor for delivery of harvested corn to the fixedly mounted husking units. A second alternative would be to build a structure rearwardly of the tractor and hingedly mount the entire corn harvester at its rearward end adjacent the wagon elevator so that the entire machine rocked about this rearwardly extending pivot point providing for any degree of height of cut at the forward end without varying the height of the wagon elevator. However, this latter construction is not economical and hence has not been found to be practical.

Corn pickers are equipped with downwardly and forwardly inclined cooperative snapping rolls which are for the purpose of grasping standing stalks therebetween and forcing them downwardly to the point of attachment of the ear or ears thereon to cause a snapping of the ears from the stalks. Obviously the snapping rolls operate at peak efficiency only within a minimum range of angular inclination. Thus vertical adjustment of the picker units has also been limited by reason of this necessity for maintaining the snapping rolls at an operating angle.

It is therefore a principal object of the present invention to provide an effective pivot area rearwardly of the tractor at substantially the location of the wagon elevator without employing any added supporting structure.

Another important object of this invention is the provision of linkage means positioned intermediate a corn harvester and a tractor on which the corn harvester is to be mounted and lifting means for the corn harvester relative to the tractor and arranged in such a manner that when the corn harvester has its forward end raised and effective or virtual pivot of the corn harvester on the tractor is at a closely held location rearwardly of the tractor and substantially at the rearward end of the corn harvester whereby when the forward end of the corn harvester is raised and/or lowered there is a minimum or no movement vertically of the corn harvester at its rearward end.

A still further important object of this invention is to supply a tractor-mounted corn picker wherein the tractor is equipped with pivot mounting means for the corn picker and including a toggle-like link mechanism therebetween and lift mechanism for the corn picker whereby the toggle-like linkage actuates to create a virtual pivot substantially rearwardly of the actual pivot connection.

Another and still further important object of this invention is to equip a tractor-mounted corn picker of the type having an upwardly and rearwardly inclined wagon elevator which receives its operation from a tractor power take-off and having a plurality of universal joints in the power take-off drive, with lifting and mounting mechanism for tilting the corn picker relative to the tractor to accomplish a harvesting of a corn crop at any desired level and the lifting and mounting mechanism including means for locating the virtual pivot area of the corn picker relative to the tractor substantially rearwardly of the tractor whereby there is a minimum of downward movement of the wagon elevator and a minimum of out-of-line movement of the universal joints in the power take-off drive to the complete picker assembly.

Another important object of this invention is to effectively shift the pivot location of a corn harvester on a tractor whereby the forward picking portion of the harvester may have greater vertical adjustment with a minimum of angular change in the corn snapping rolls carried within the corn harvester.

Other and further important objects and advantages will become apparent from the disclosures in the following specification and accompanying drawings.

In the drawings:

Figure 1 is a side elevational view of the tractor-mounted corn picker of this invention and showing portions thereof removed to clearly depict the adjustable lifting of the corn picker relative to the tractor;

Figure 2 is a view similar to Figure 1 with the corn picker pivotably adjusted upwardly at its forward end relative to the tractor;

Figure 3 is an enlarged top plan view of the under carriage or supporting frame for the corn picker with the corn picker removed and the tractor portion or chassis shown in phantom; and Figure 4 is an enlarged side elevational detail of the lifting and pivoting mechanism for the corn picker on the tractor.

As shown in the drawings the reference numeral 10 indicates generally an agricultural type tractor having steerable front wheels 11 and rearwardly disposed traction wheels 12. The tractor also includes a longitudinally extending rather narrow and elongated engine and chassis 13. An operator's seat 14 is disposed at the rearward end of the chassis 13 and a steering wheel 15 is closely adjacent thereto to permit the operator to steer the tractor. For purposes of convenience and to indicate symmetrical construction of the device the parts on the far side of the tractor and the machine mounted thereon will be given the same reference numerals but with the suffix "a" added thereto. The ground-engaging traction wheels 12 are spaced apart on the rearward end of the vehicle on axles 16 and 16a as best shown in Figure 3. The tractor chassis 13 is shown in phantom in Figure 3. The rearward end of the chassis terminates in a differential housing 17 having laterally extending axle housings 18 and 18a carrying the axles 16 and 16a respectively. From the rear end of the differential housing 17 there extends a power take-off shaft 19 to supply drive to various implements which are mounted on or pulled by the tractor 10. The power take-off shaft 19 is covered by a hood or shield 20 to prevent entanglement of the operator's clothes with the rotating shaft 19.

The tractor of this invention as thus described is for the purpose of carrying various agricultural implements, but the present invention is concerned primarily with the mounting of a corn harvester thereon. Obviously the principles of mounting and raising and lowering could be equally adapted to other implements and harvesters other than corn pickers, but for convenience the invention will be shown with the corn harvester. The corn harvester as shown herein includes a generally forwardly and downwardly inclined corn picking unit 21 and downwardly and rearwardly inclined husking units 22 at the rearward end of the machine. A forwardly disposed center divider 23 is for the purpose of shielding the front steerable wheel 11 of the tractor and the front end of the engine chassis 13 to thereby direct standing corn into either of the picking units 21 on the sides flanking the engine chassis 13. Figure 1 shows the corn picking units disposed closely adjacent the ground 24 whereas in Figure 2 the corn picking unit has been raised so that the center divider 23 and the picking unit 21 are substantially above the ground line 24. This means that the tractor mounted corn picker may be transported or may harvest corn at this substantially higher level or any intermediate level of adjustment of the picking units. The invention herein concerns the vertical adjustment of the picking units and the hinge or pivot mounting of the corn picker on the tractor to effect a virtual pivot removed from the location of the actual pivot.

As best shown in Figure 3 wherein there is depicted a top plan view of the under carriage or support for the picker on the tractor it is quite evident that the axle housings 18 and 18a supply the primary supporting means for the rearward end of the supporting frame work on which the corn picker is mounted. Clamping elements 25 and 25a on spaced sides of the tractor and mounted on the axle housings 18 and 18a respectively support upwardly extending brackets 26 and 26a, all of which become part of the general supporting means on the tractor. A first link arm or linkage means 27 as shown in Figure 4 is pivotally mounted at 28 onto the brackets 26. A second link arm 29 constituting a fixed part of the corn harvester is pivotally mounted at 30 on one end of the link arm 27. Together the multiple links 27 and 29 constitute a toggle-like linkage. This second link is affixed to the corn harvester by means of bolts or rivets or the like 31 as shown in Figure 4. It should be apparent the link arm could be directly attached to the corn harvester body without a downwardly depending link. Another end of the first link arm 27 is pivotally attached at 32 to a downwardly and forwardly inclined rigid frame or link member 33. The lower end of the arm or link 33 is pivotally mounted at 34 to a second arm or bellcrank member 35. The bellcrank member 35 has a downwardly and rearwardly extending arm 36 and a downwardly and forwardly extending lifting arm 37. The bellcrank 35 is fixedly mounted on a shaft 38 which is journally carried in spaced apart downwardly extending brackets 39 and 39a for pivotal rotation of the unit. The brackets 39 and 39a are suspended beneath the tractor 10 and fastened to the engine chassis 13 by bracket plate members 40 and 40a by means of bolts or cap screws or the like 41 and 41a. An hydraulic cylinder 42 is disposed beneath the tractor and chassis thereof and has one effective end portion as shown at 43 pivotally attached to the downwardly and rearwardly depending bellcrank arm 56 to be subsequently described in detail. Thus an extension or a withdrawal of the movable piston rod 44 will cause an arcuate swinging movement of the bellcrank 35 with and about the shaft 38. The rearward end 45 of the hydraulic cylinder 42 is pivotally mounted to bracket means 46 depending downwardly from the engine chassis 13 and located adjacent the differential housing 17. Attention is directed to Figure 3 of the drawings wherein the bracket element 46 is in the form of a bail having spaced apart upwardly extending arms 47 and 47a which are attached at 48 to the side of the tractor chassis 13. For the purpose of the present invention it will be presumed that the bail member 46 is locked in fixed position as shown in Figures 3 and 4. This mechanism carries spaced-apart socket-receiving elements 49 and 49a which, as shown in Figures 3 and 4, receive and carry a drawbar 50 having forwardly projecting arms 51 and 51a which project into the sockets 49 and 49a respectively. The linkage around the bail member 46 is normally to facilitate some adjustable movement of the drawbar 50. However, in the present instance the drawbar is used only to pull a trailing wagon or the like and it is not necessary or desirable to effect separate movement thereof. Thus the hinge or pivot 45 of the hydraulic cylinder 42 remains fixed relative to a bracket member 52 which is supported on and carried by the bail member 46. The rearwardly extending supporting members 49 and 49a are similarly carried from the bail member 46 by reason of the angled supports 53 and 53a, both of which are mounted on the bail member 46 at their forward end and onto the intermediate bracket 52 as shown at 54. For the purpose of this application the hinge 43 of the piston rod 44 includes spaced points as indicated at 43 and 43a. These pivots 43 and 43a are in axial alignment and flank the body of the hydraulic cylinder 42. The device includes spaced arms 55 and 55a which are fastened to the shaft 38 and form a part of the pivot 43 and 43a. Second arms 56 and 56a are also pivoted on and with the pivots 43 and 43a and extend forwardly to a cross shaft 57 upon which is mounted a clevis 58 on the rearward end of the piston rod 44. Thus as the piston rod 44 is extended from the cylinder 42 there is a rotation of the shaft 38 and thus also a concurrent rotation of the spaced-apart arms thereon identified as 37 and 37a. Stub rod members 60 form a part of the corn picking units as shown in Figures 1 and 2 and when the arms 37 are moved upwardly by extension of the cylinder and piston the arms lift the rod members 60 causing the picking units to raise from a low level as shown in Figure 1 to the high level thereof as shown in Figure 2.

The connection of the link 33 to the bellcrank arm 36 is shown in Figure 4. It is evident from an examination of Figure 3 that a corresponding arm or link 33a is provided on the other side of the machine and is hingedly mounted at 34a on the bellcrank arm 36a. The bellcranks 35 and 35a are affixed to the shaft 38 and thus when the shaft 38 is arcuately rotated so also are the bellcranks 35 and 35a rotated to effect a lifting of the picker units as shown in Figure 2. Conversely of course when it is desired to lower the picking units the piston rod 44 is retracted within the cylinder 42 causing the bellcrank arms 37 and 37a to swing downwardly and thus lower the picker to any desired level and to the extreme as shown in Figure 1.

The links 27 and 29 are duplicated on the far side of the machine, as shown at 27a and 29a. Both toggle-like link mechanisms operate uniformly and when it is desired to raise the picker units, as shown in Figure 2, the hydraulic cylinder 42 is actuated, causing a direct raising of the picking units by the bellcrank arms 37 and 37a. Simultaneously and by reason of the toggle-like linkage 27—29 there is a swinging of the entire corn harvester arcuately upwardly so that in effect there is a virtual pivot of the entire corn harvester in an area at a substantial distance behind the toggle-like linkage. This permits the maximum raising of the picker units without causing an objectionable concurrent downward swinging of a wagon elevator 61 which is pivotally attached at the rearward end of the husking unit 22 or an objectionable disposing of the corn harvester snapping rolls at a substantially horizontal position. With the employment of the toggle-like links 27—29 which open in jackknife fashion to the position as shown in Figure 2 there is no rocking movement of the corn harvester about a general location of the axle housing 18 but rather there is an effective pivoting of the entire corn harvester about an area center in the vicinity of the wagon elevator pivot. The wagon elevator 61 as shown in Figure 1 has an upper rearward end 62 where the corn discharges into a trailing wagon or the like, not shown. The wagon elevator 61 remains generally at a fixed angle except when the front end of the corn harvester, that is the picker units are raised then it is desired to slightly raise the wagon elevator so that it does not swing downwardly and strike the top of the trailing wagon. Thus a link member 63 is pivotally attached at 64 to a rearward extension of the link arm 33 and at its upper rearward end is pivotally attached at 65 to the side of the wagon elevator 61. Here again the link members 63 are duplicates and thus there are links 63 and 63a which flank the sides of the wagon elevator and cause a uniform holding of the elevator angle in a fixed and desired position. However, when the picker units are raised there is a downward movement of the links 33 and thus a forward and downward movement of the elevator links 63 and 63a to thereupon effect a raising of the wagon elevator 61 about its lower hinge pivot 66 on a bracket 67 formed on the lower rearward end of the husking unit 22.

The drive for the wagon elevator and also the drive for the husking unit is taken from the power takeoff shaft 19 and thus passes through a first knuckle or universal joint 68, through a coupling 69 and thence through a second universal joint or knuckle 70 for delivery to a gear box or the like 71 which imparts rotational drive to the husking unit 22 and to the wagon elevator 61, the details of which have not been shown in this application. It is believed sufficient to locate and place the drive from the power take-off of the tractor to this particular spot on the implement. Thus, as the lower end of the wagon elevator 61 is located close to the virtual or actual pivot of the corn harvester when the picking units are raised by reason of the toggle-like linkage 27—29 there is a minimum of change in angular relationship of the universal joints 68 and 70 with respect to the power take-off shaft 19, the coupler 69 and the shaft 72 feeding into the gear box 71.

A hitch member 73 is fastened to the tractor drawbar at 74 as shown in Figures 1 and 2 and has a chain member 75 extending downwardly from the lower end of the wagon elevator 61 and thence up on the other side of the wagon elevator to guidingly hold the hitch member 73 in generally horizontal position. The rearward end of the hitch member 73 is provided with a connecting portion 76 to which a trailing wagon may be attached.

In the operation of the device of this invention the toggle-like linkage 27—29 is so arranged and constructed as to provide for the shifting of the pivot center of the entire corn harvester to a position rearwardly of the tractor without having actual structural members projecting rearwardly from the tractor upon which the corn harvester may be so pivoted. This when the picking units are raised by upward swinging movement of the arms 37 and 37a there is a comparable downward pulling of the toggle-like link 27 and an upward movement of the pivotal connection 30 between the links 27 and 29 as shown in Figure 2 whereupon there is a raising of the corn harvester throughout its full length forwardly of a location in the vicinity of the lower end of the wagon elevator 61. Thus there is little movement or at least a minimum of downward swinging movement of the wagon elevator and thus no problem of the wagon elevator scraping the ground upon maximum raising of the forwardly disposed picking units. Nor, is there any problem of having the universal joints 68 and 70 in the drive mechanism assuming some impossible angle of drive. And still further, there is no problem of having the corn harvester snapping rolls assuming some inoperative angle upon raising the forwardly disposed picking units. There is provided a virtual pivot for the tractor-mounted corn harvester of this invention wherein the pivot of the corn harvester is located spaced from the actual pivotal connection of the implement to the tractor.

I am aware that numerous details of construction may be varied throughout a wide range without departing from the principles disclosed herein and I, therefore, do not propose limiting the patent granted hereon, otherwise than as necessitated by the appended claims.

What is claimed is:

1. In a combination tractor and agricultural implement mounted thereon in which the tractor is of the type having a supporting means adjacent its rear axle housing, a lifting member located forwardly of the axle housing, and means on the tractor for rocking said lifting member, linkage means pivotally attached to said supporting means adjacent the rear axle housing of the tractor, and the agricultural implement pivotally mounted on said linkage means at a position spaced from the pivotal attachment to said supporting means, and link means having one end pivotally joining said linkage means to said lifting member from a position on the linkage means spaced from both the pivotal attachments of the linkage means to the supporting means and the agricultural implement to the linkage means and having its other end pivotally joined to the lifting member whereby the rocking of the lifting member operates to control the vertical movement of the agricultural implement and to effect a shifting pivot of the implement relative to the tractor.

2. A device as set forth in claim 1 in which there is included a fixed arm fastened to and forming part of said agricultural implement and which link arm provides the pivotal mounting to the linkage means, whereby when the agricultural implement is raised the linkage means and the fixed arm open or close to effect the shifting pivot of the implement relative to the tractor.

3. A device as set forth in claim 1 in which the linkage means constitutes a toggle-like linkage and comprises a first link pivotally mounted on said tractor adjacent said axle housing, a second link affixed to said implement and pivotally joining said first link in jack-knife fashion and said pivotal joining spaced from said pivotal mounting of the first link on the tractor.

4. An agricultural implement comprising an elongated mobile support, a first arm pivotally supported on said mobile support, one end portion of said arm being pivotally connected to a portion of said implement, a second arm pivoted on said mobile support, one end portion of said second arm being pivotally associated with a second longitudinally spaced portion of said implement, and linkage means interconnecting the second ends, respectively, of said arms, whereby when one of said arms is moved about its pivot said implement will be moved vertically.

References Cited in the file of this patent

UNITED STATES PATENTS

| | | |
|---|---|---|
| 2,527,823 | Karlsson et al. | Oct. 31, 1950 |
| 2,736,152 | Andrews et al. | Feb. 28, 1956 |